(12) United States Patent
Cumbria et al.

(10) Patent No.: US 8,113,331 B2
(45) Date of Patent: Feb. 14, 2012

(54) ROTATING MATERIALS HANDLING CHUTE

(76) Inventors: Neil Cumbria, Edmonton (CA); Walter Cumbria, Spruce Grove (CA)

( * ) Notice: Subject to any disclaimer, the term of this patent is extended or adjusted under 35 U.S.C. 154(b) by 56 days.

(21) Appl. No.: 12/244,649

(22) Filed: Oct. 2, 2008

(65) Prior Publication Data
US 2009/0090595 A1 Apr. 9, 2009

Related U.S. Application Data

(60) Provisional application No. 60/978,107, filed on Oct. 6, 2007.

(51) Int. Cl.
*B65G 47/20* (2006.01)
(52) U.S. Cl. ............. 193/15; 193/23; 222/147; 222/167
(58) Field of Classification Search .................. None
See application file for complete search history.

(56) References Cited

U.S. PATENT DOCUMENTS

| | | | |
|---|---|---|---|
| 2,436,624 A | 2/1948 | Volk | |
| 3,393,791 A | 7/1968 | Heitzer | |
| 3,926,289 A | 12/1975 | Yoshioka | |
| 4,347,922 A * | 9/1982 | Curry et al. | 193/23 |
| 4,754,869 A * | 7/1988 | Hutchison et al. | 198/536 |
| 4,757,869 A * | 7/1988 | Morishita et al. | 180/446 |
| 5,803,695 A | 9/1998 | Schlagel | |
| 6,261,045 B1 | 7/2001 | McFall | |
| 6,662,832 B2 | 12/2003 | Baker | |

FOREIGN PATENT DOCUMENTS

| | | |
|---|---|---|
| GB | 1336733 | 11/1973 |
| GB | 2139199 A | 11/1984 |

* cited by examiner

*Primary Examiner* — Kavel Singh
(74) *Attorney, Agent, or Firm* — Stephen R. Burri

(57) ABSTRACT

A chute for directing materials from a source conveyor to a plurality of discharge conveyors, the chute comprising an upper chute section having a central vertical axis; a chute body movable between a raised position and a lowered position and rotationally connected below the upper chute section by rotation means for rotating the chute body about the central vertical axis between at least two selected rotational positions; and a plurality of lower chute sections, each lower chute section reversibly connectable at an upper end to a lower end of the chute body at one of the selected rotational positions, and at a lower end to a conveyor.

7 Claims, 25 Drawing Sheets

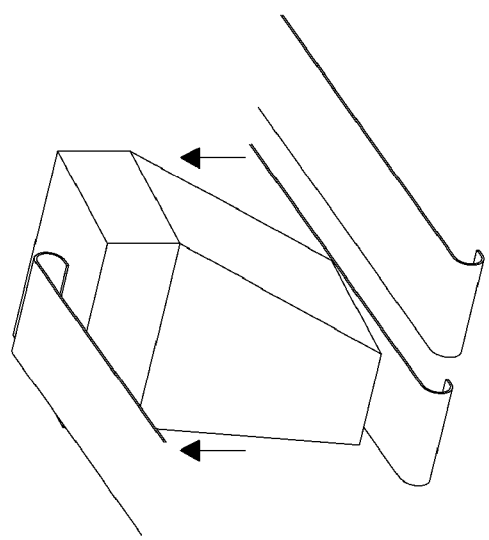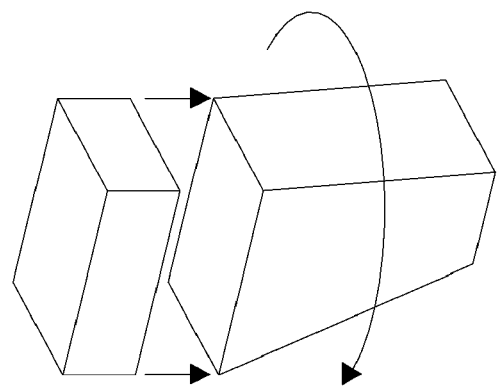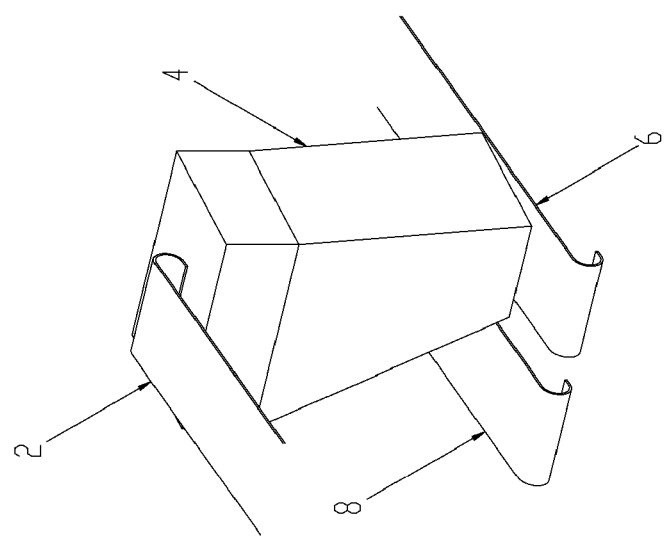
FIG. 3

ROTATING MATERIALS HANDLING CHUTE

TECHNICAL FIELD

The present invention relates to materials handling chutes. In particular, the present invention relates to a materials handling chute which may be rotated among a plurality of conveyors.

BACKGROUND OF THE INVENTION

Prior art material handling discharge chutes exist primarily in one of two designs. As shown in the prior art depiction in FIG. 1 of a fixed chute design, a single chute body 4 is fixed in position with its upper opening positioned below a supply source 2, which may be a conveyor or a crusher, for example. The lower discharging end of the chute is positioned above a second conveyor 6 or other receiver such as a cargo vehicle. This simple chute design allows a relatively high angle of material descent through the chute.

Where the supply material is required to be discharged onto more than one conveyor 6 or other receiver, the fixed chute of FIG. 1 would require unbolting of the chute 4 at its upper and lower ends, rotation and repositioning over another conveyor 8 or other receiver using a hoist, rigging or crane, and reattachment at its upper and lower ends in the new position, as depicted in FIG. 3. This repositioning exercise may be expensive and lengthy, requiring shut down of materials delivery to the chute for an extended period.

As shown in FIG. 2, there exist pant-leg chutes 12 which provide dual discharge ends having a common receiving portion. Materials flow may be selectively directed to first or second discharge ends of the chute by selectively positioning a gate from a first position blocking a first discharge end to a second position blocking a second discharge end. This design permits relatively quick transition from one discharge chute 6 to another 8. However, the pant-leg design necessitates a relatively low angle of descent for the materials passing through the chute. This may result in frequent blockage of the chute for large component materials or wet materials. The gate also may not reposition correctly, for example if material falls into a position to prevent proper seating of the gate, resulting in continued discharge of materials to the incorrect conveyor.

SUMMARY OF THE INVENTION

There is provided a chute for directing materials from a source conveyor to a plurality of discharge conveyors, the chute comprising an upper chute section having a central vertical axis; a chute body movable between a raised position and a lowered position and rotationally connected below the upper chute section by rotation means for rotating the chute body about the central vertical axis between at least two selected rotational positions; and a plurality of lower chute sections, each lower chute section reversibly connectable at an upper end to a lower end of the chute body at one of the selected rotational positions, and at a lower end to a conveyor.

The rotation means may comprise a plurality of hanger supports disposed around the periphery of the upper chute section; a hanger extending below each hanger support; a rotating track fixedly connected to the upper end of the chute body; a plurality of rollers, each connected to the inner side of the lower end of each hanger, for receiving the rotating track when the chute body is in the lowered position; and one or more lever insertion ports for receiving one end of each of one or more levers for use in manual rotation of the chute body between a first rotational position over a first discharge conveyor and a second rotational position over a second discharge conveyor.

The chute may have at least one removable spacer disposable between the chute body and the lower chute section to which it is connected. Further, the chute may have a plurality of lower chute section covers for removably covering each lower chute section when that lower chute section is not connected to the chute body.

There is further provided a method of repositioning a chute from a first rotational position to a second rotational position, comprising the steps of: rotating the operator wheel clockwise to direct the spindle attached thereto inwardly, causing the spindle to exert inward pressure on the external wall of the diversion plate to tilt the diversion plate inwardly until its lowermost end is above the horizontal plane defined by the third flange; removing the lower chute section cover from the lower chute section to which the chute body is to be rotated by removing flange bolts joining the cover to the fifth flange; removing the one or more spacers disposed on the fifth flange of the lower chute section to which the chute body is to be rotated; removing the flange bolts joining the second flange on the upper chute section to the third flange on the chute body; removing the cinch bolts joining the first pair of cinch plates on the upper chute section to the second pair of cinch plates on the chute body to causing the chute body to drop into the lowered position in which the circular track is resting on the plurality of rollers; inserting one end of each of one or more levers into a lever receiving ports; applying force to the lever to effect rotation of the chute body along the rollers until the lower end of the chute body is in the second rotational position; re-inserting and tightening cinch bolts joining the first pair of cinch plates to the second pair of cinch plates to raise the chute body off the rollers and into the raised position; re-inserting and tightening flange bolts between the second and third flanges; lowering the diversion plate in the upper chute section by counter-clockwise rotation of the operator wheel until the diversion plate rests on the inner surface of the chute body; inserting one or more spacers between the fourth flange and the fifth flange; and re-inserting and tightening flange bolts between the fourth and fifth flanges to connect the chute body to the lower chute section in the second rotational position.

BRIEF DESCRIPTION OF THE DRAWINGS

A detailed description of the preferred embodiments is provided by way of example only and with reference to the following drawings, in which:

FIG. 3 is a view of the steps in the rotation of a prior art fixed chute;

Figure 1:
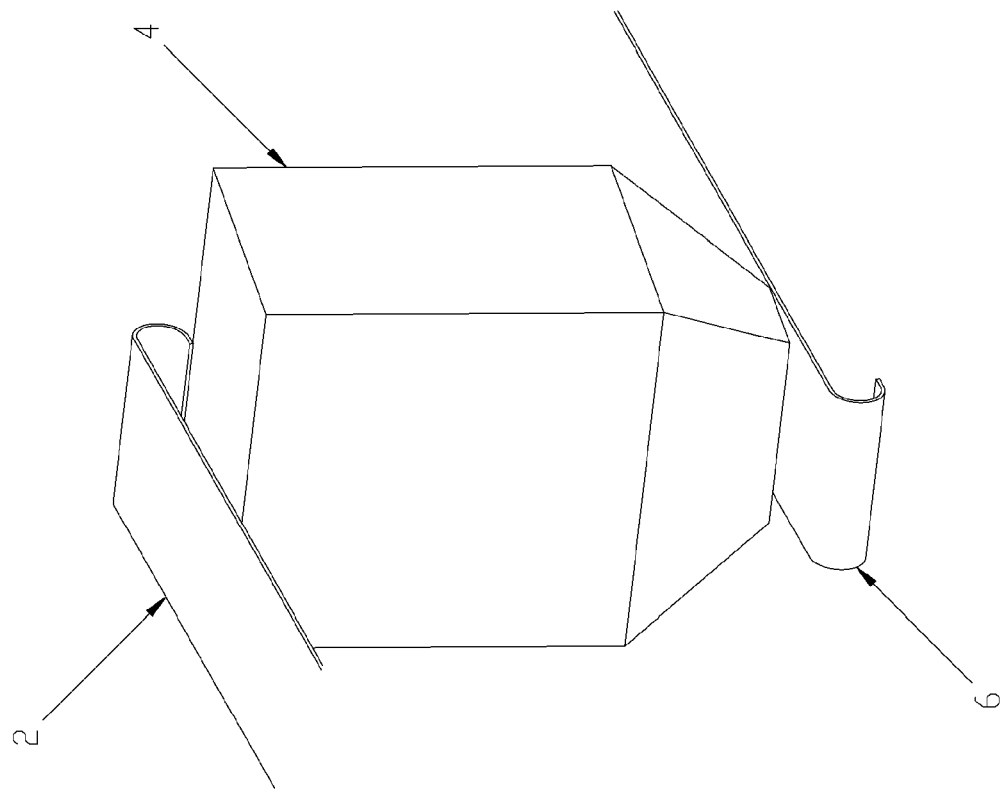
FIG. 1 is a view of a prior art fixed chute having a single discharge point.
Figure 2:
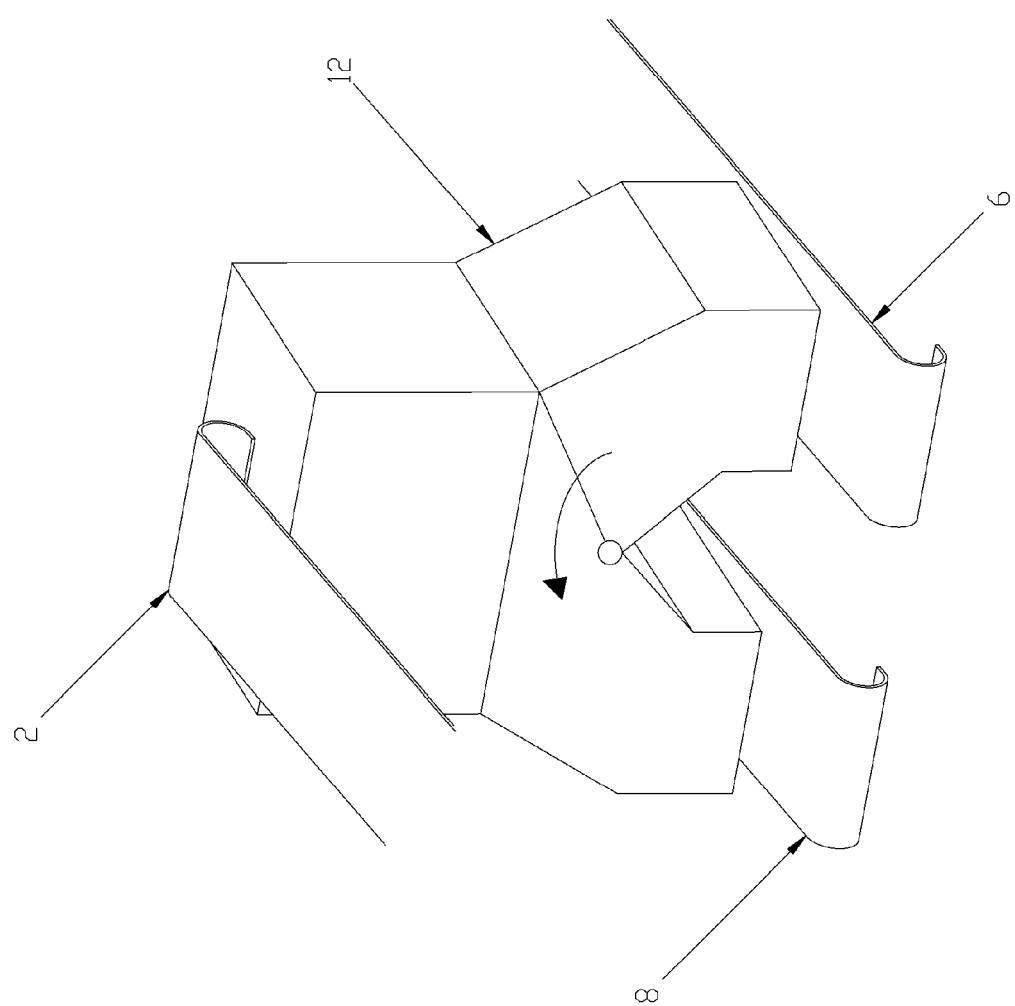
FIG. 2 is a view of a prior art pant-leg chute having two discharge points.
Figure 4:
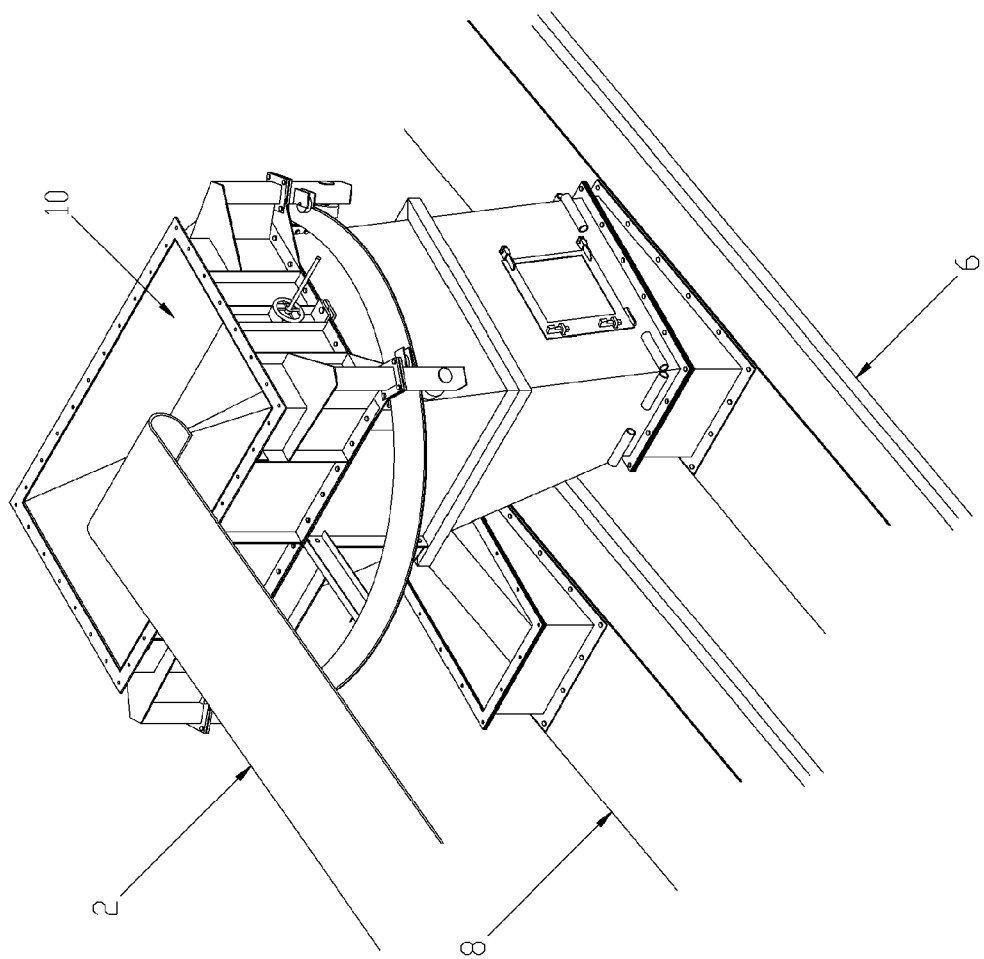
FIG. 4 is a view of the chute of the invention, showing a source conveyor above and two discharge conveyors below.
Figure 5A:
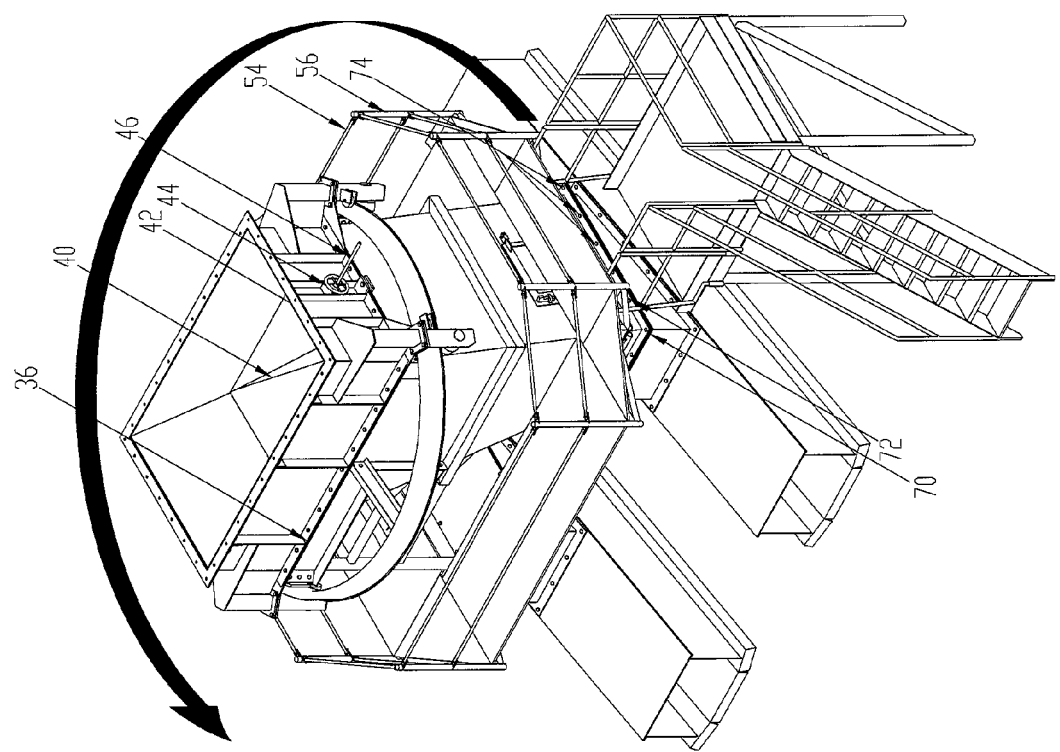
FIGS. 5A and 5B depict the rotation of the chute of the invention between two discharge conveyors.
Figure 5B:
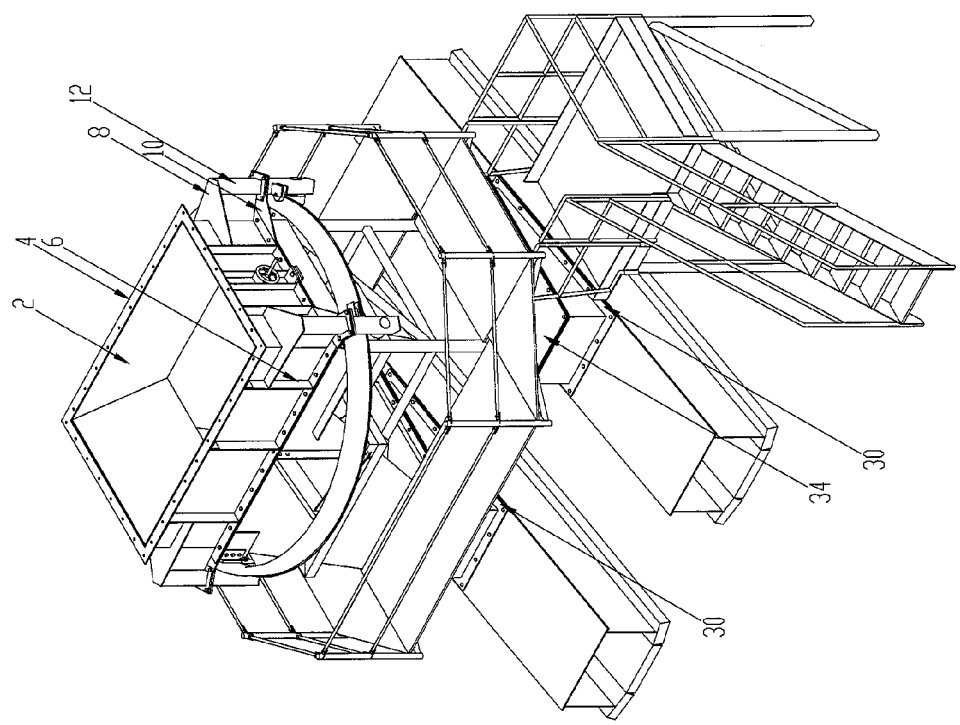
Figure 6:
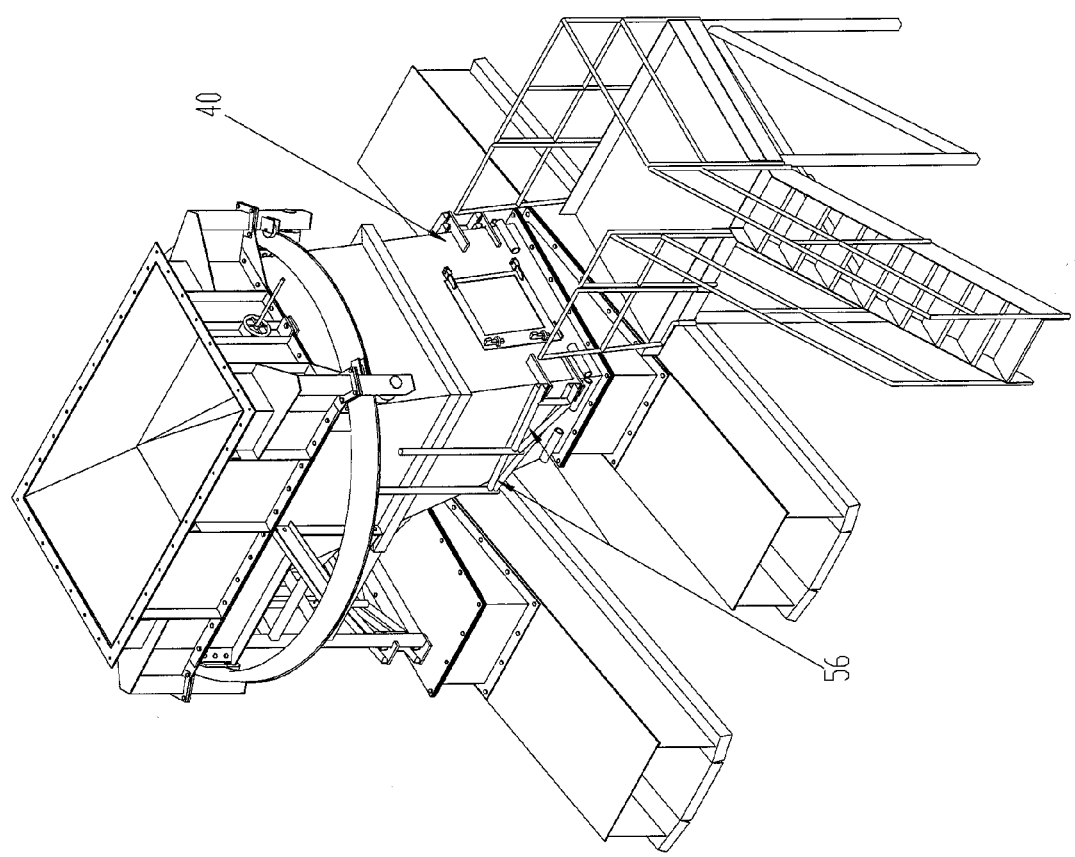
FIG. 6 is a view of the chute of the invention in a first rotational position over a first conveyor, showing the access platform assembled adjacent the chute.
Figure 7A:
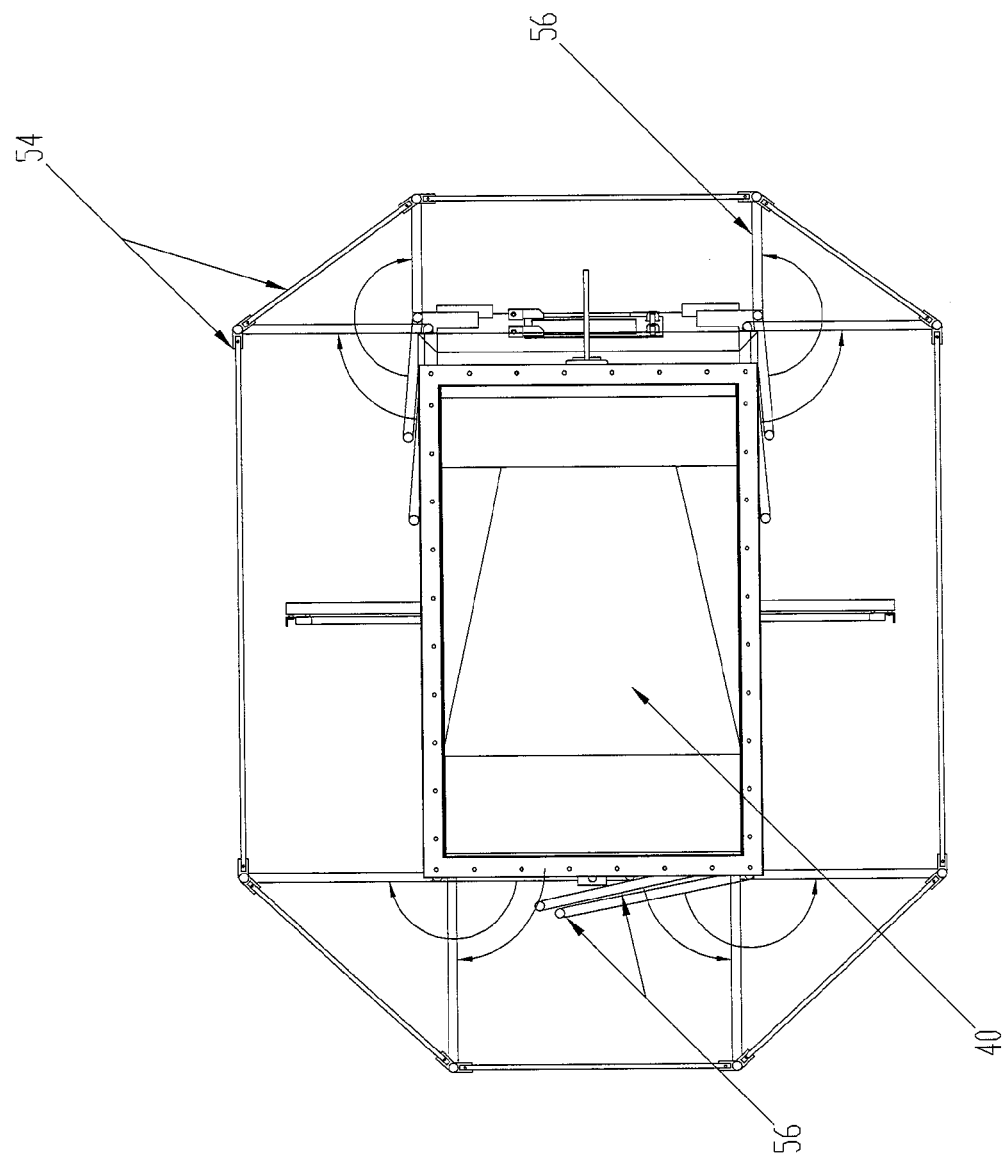
FIGS. 7A and 7B depict the assembly of the removable assembly platform.
Figure 7B:
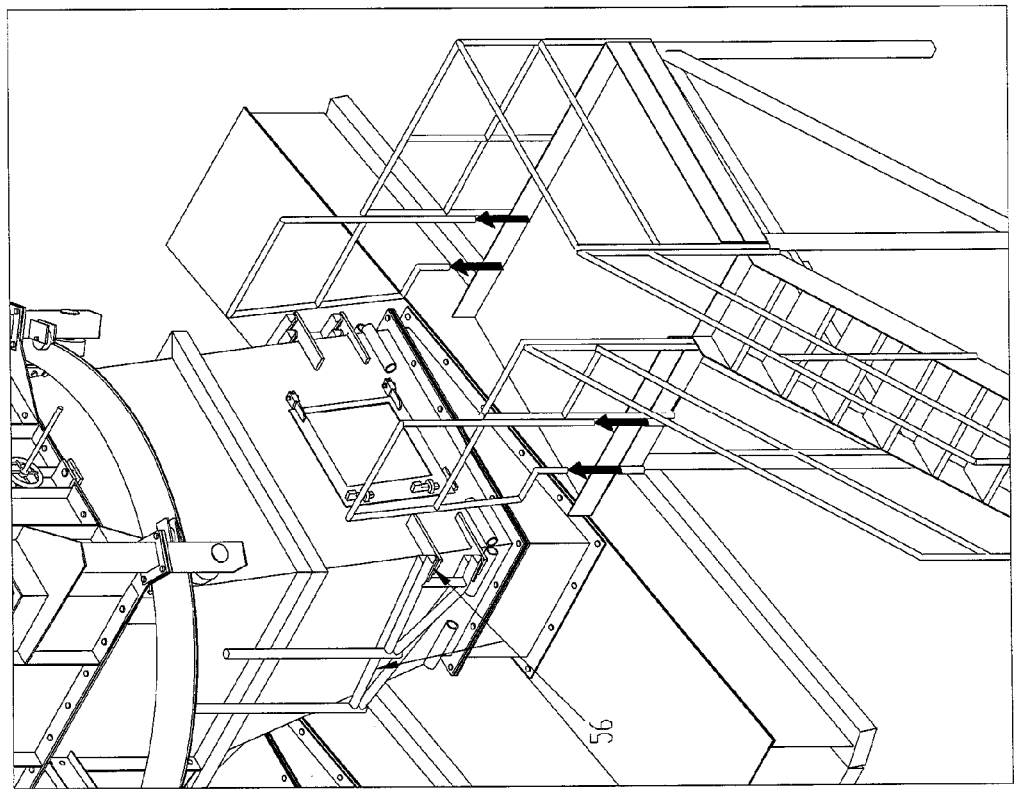
Figure 8:
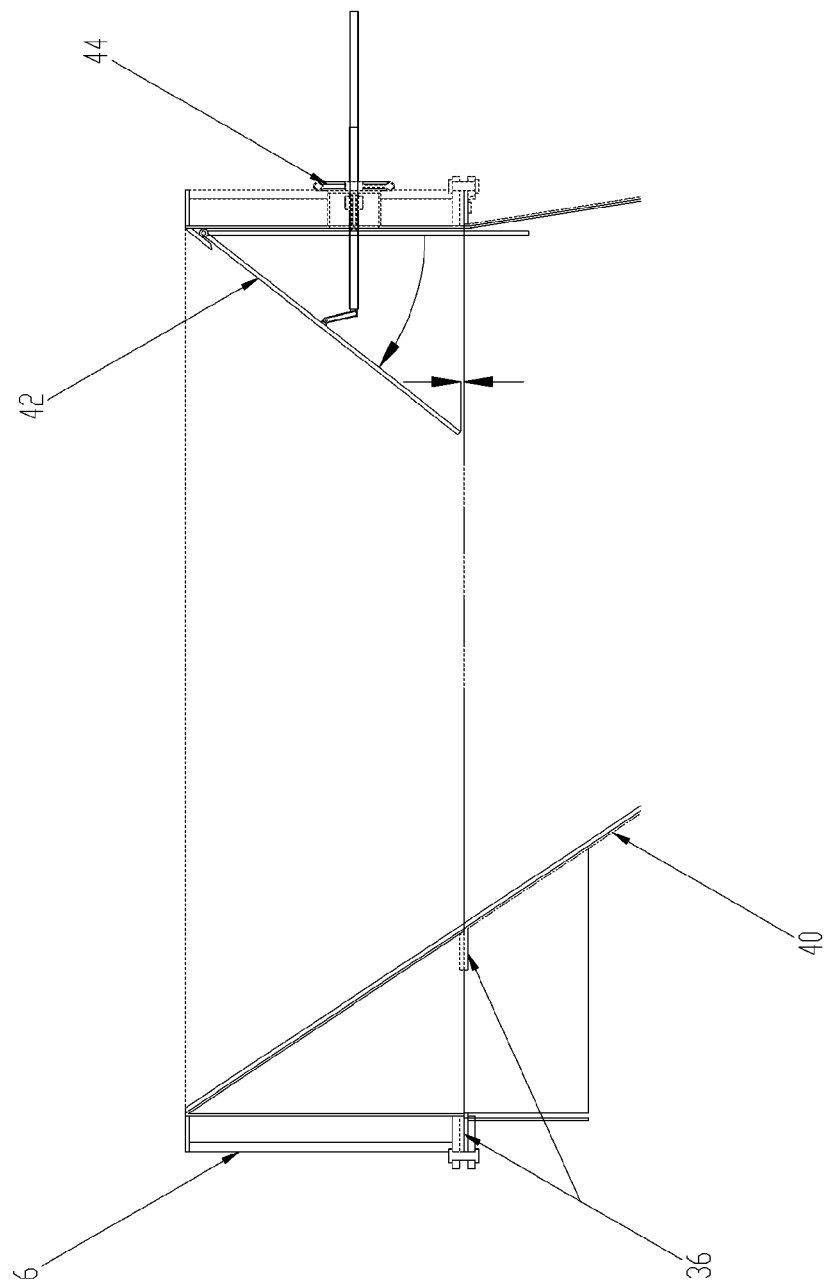
FIG. 8 depicts the lifting of the chute flow control gate using the spindle attached to the operator wheel.
Figure 9:
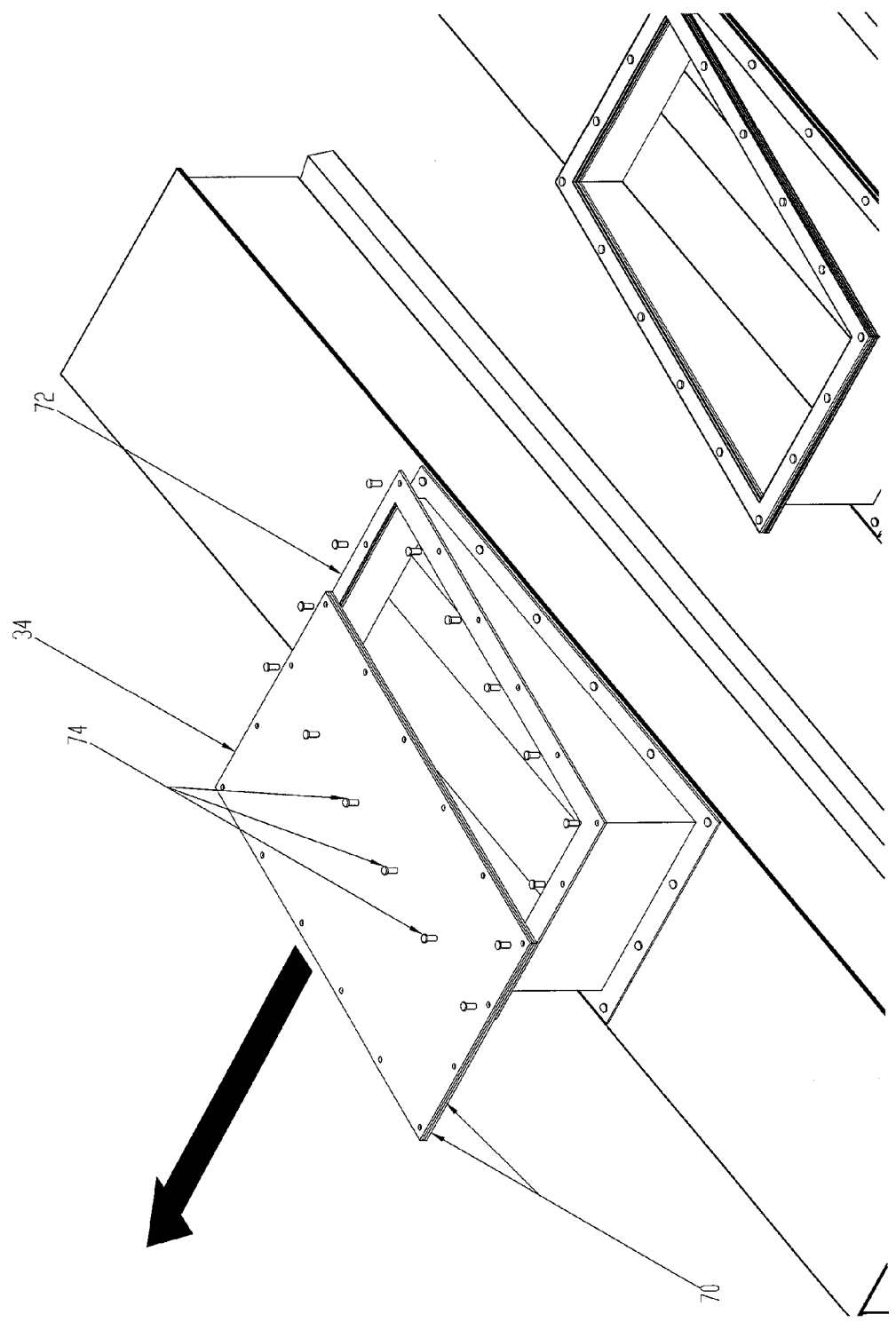
FIG. 9 depicts the removal of a lower chute section cover.
Figure 10:
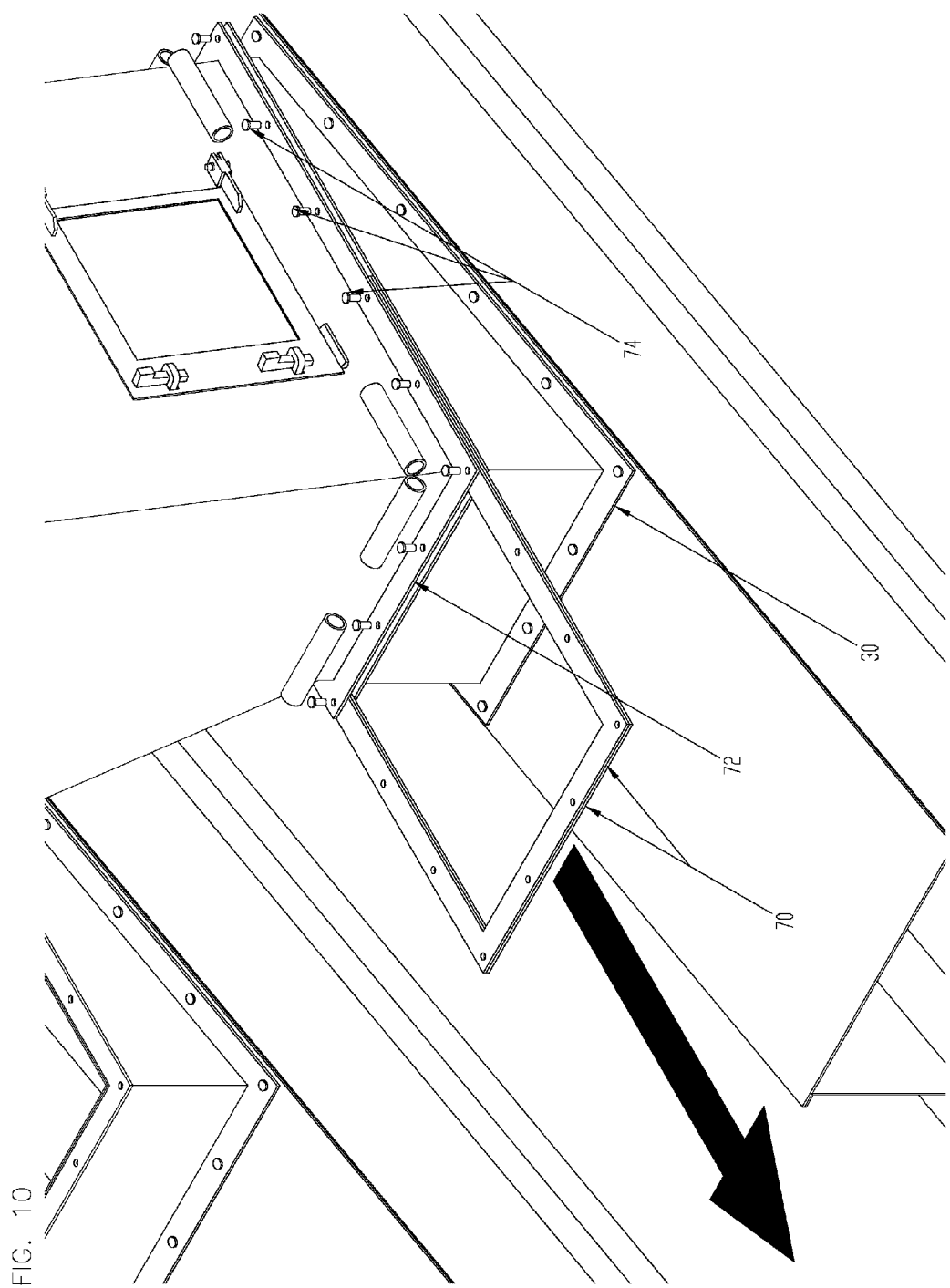
FIG. 10 depicts the removal of one or more spacers from between the chute body and the lower chute section.
Figure 11:
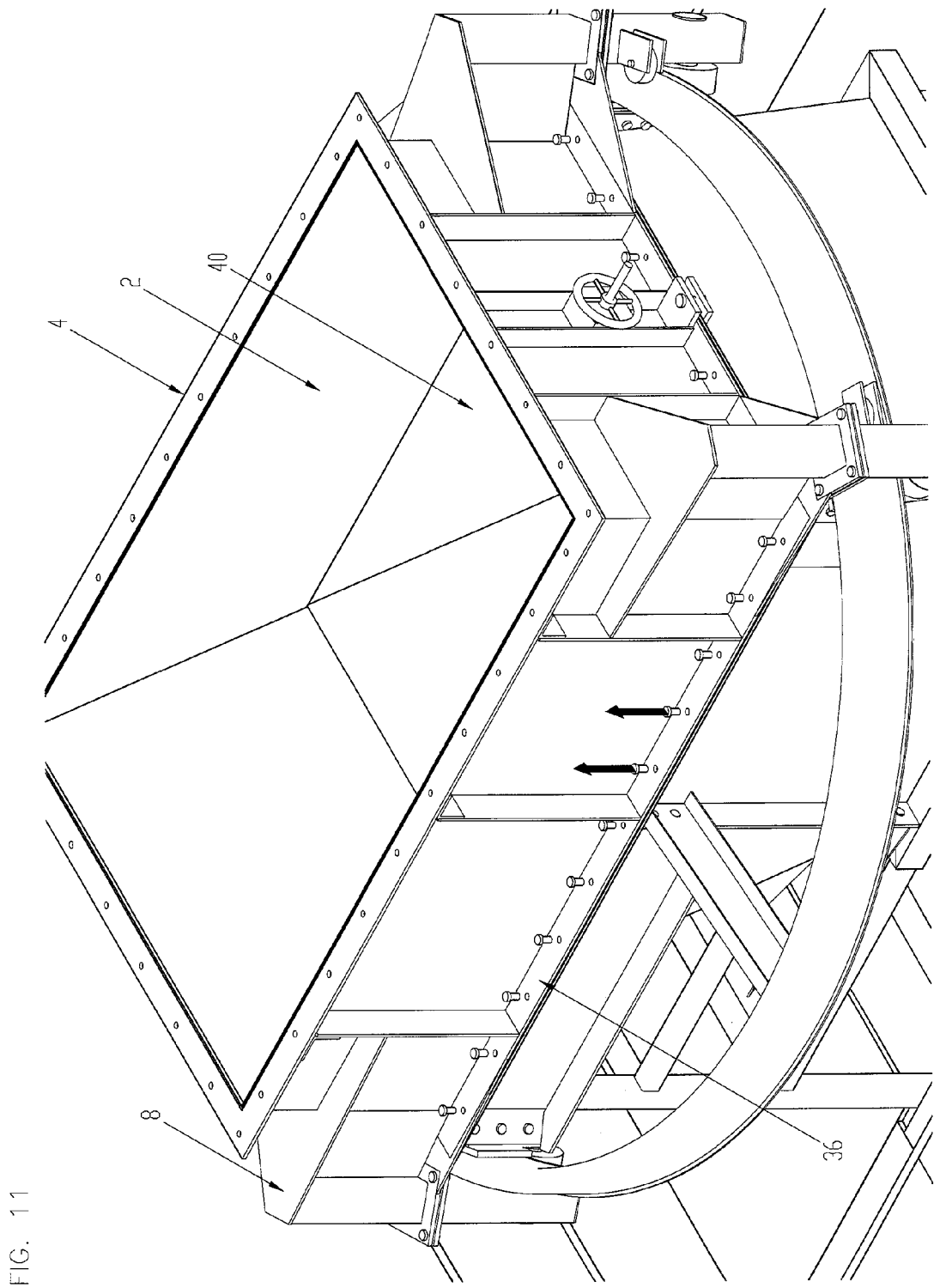
FIG. 11 depicts the removal of flange bolts joining the upper chute section to the chute body.
Figure 12:
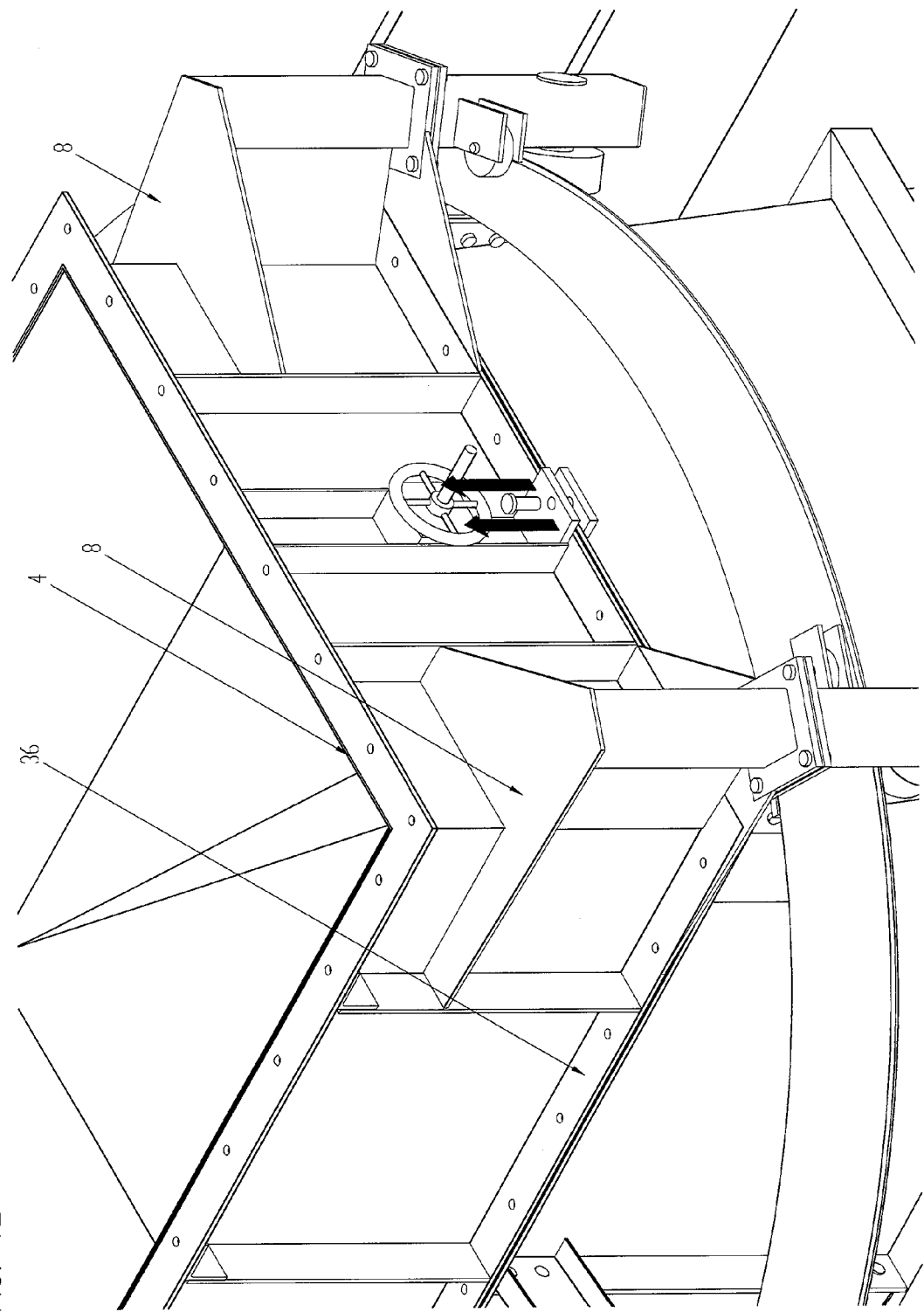
FIG. 12 depicts the removal of cinch bolts joining the upper chute section to the chute body.
Figure 13A:
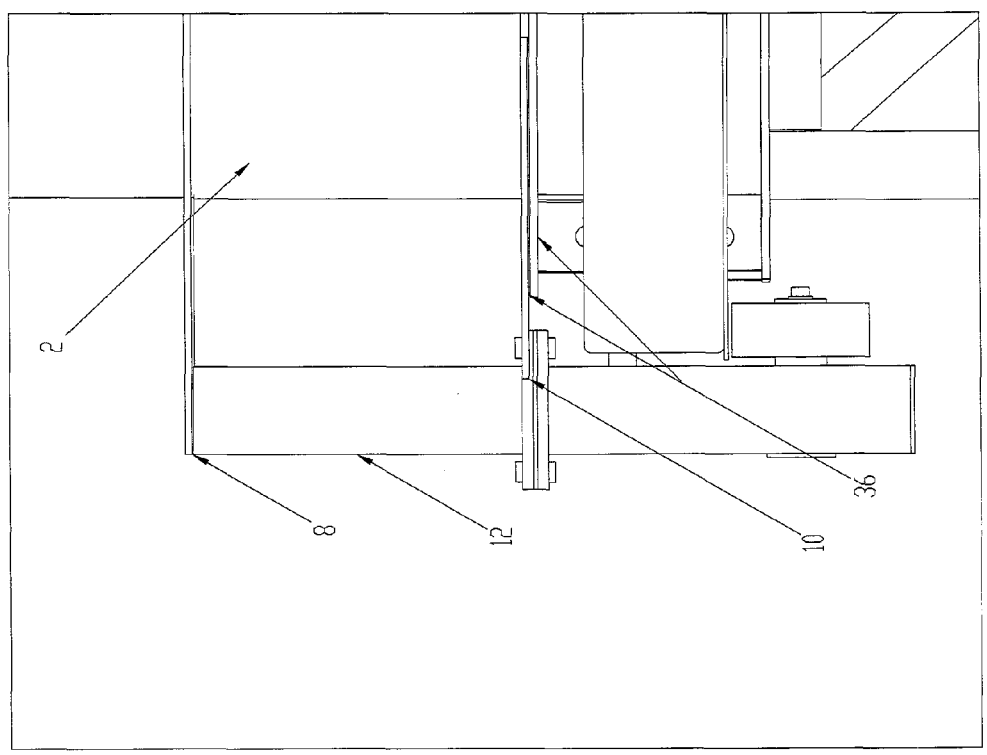
FIGS. 13A and 13B are side views of the chute depicting the lowering of the chute body from the raised position of FIG. 13A to the lowered position of 13B.
Figure 13B:
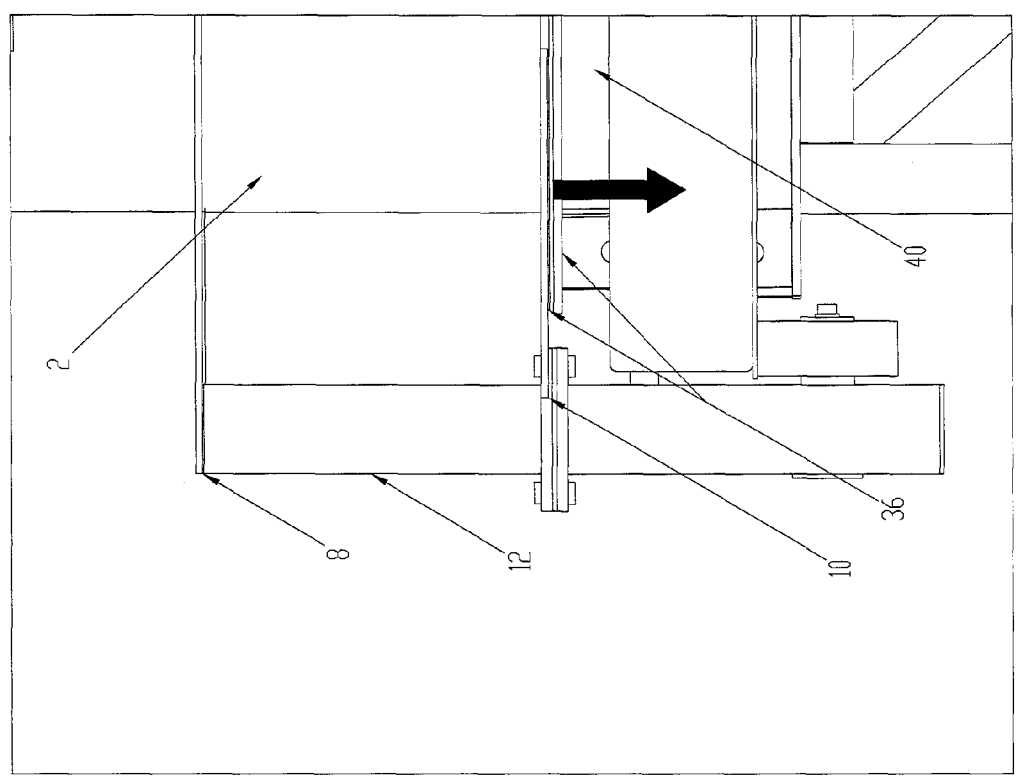
Figure 14:
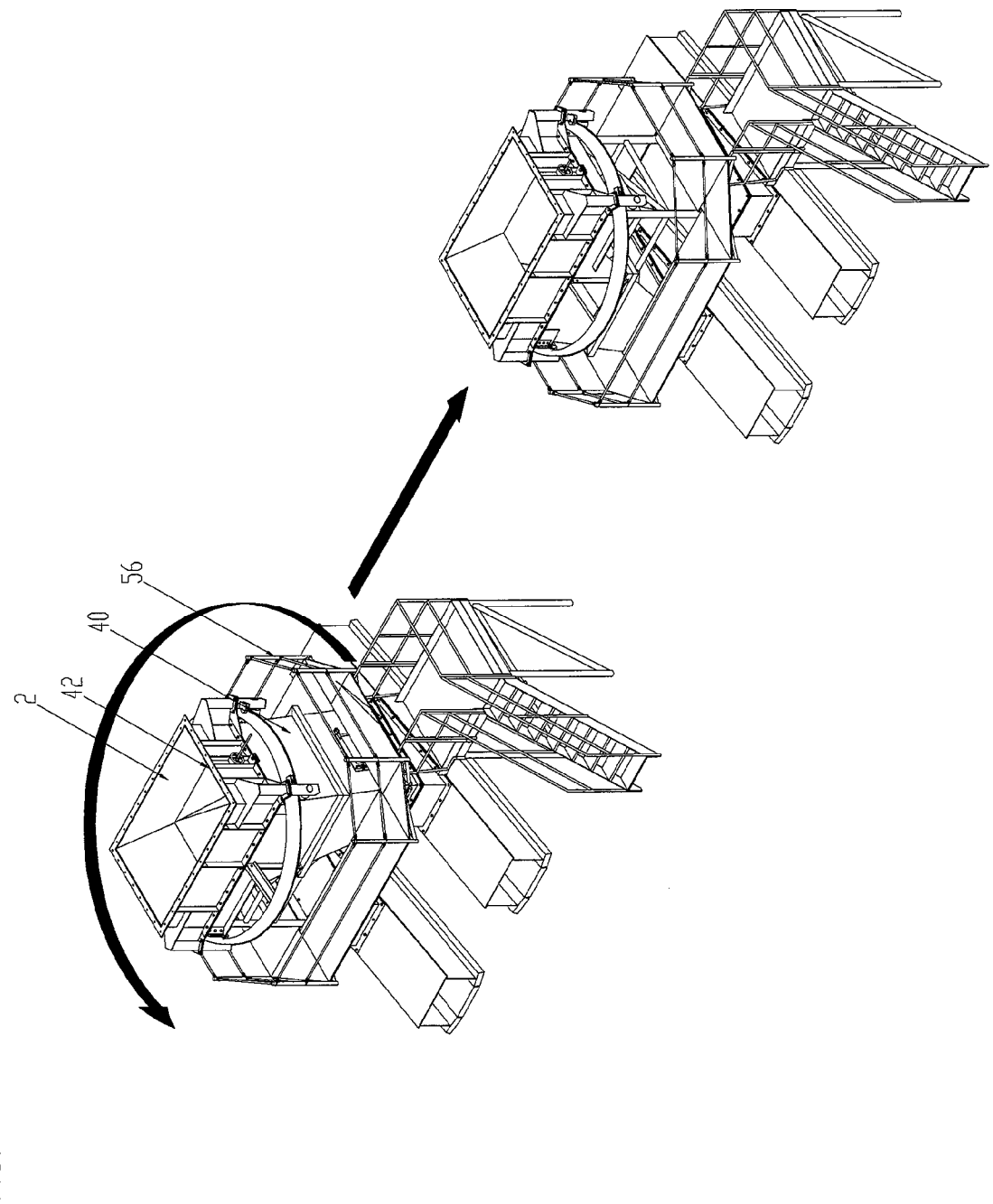
FIG. 14 depicts the rotation of the chute of the invention between two discharge conveyors.
Figure 15:
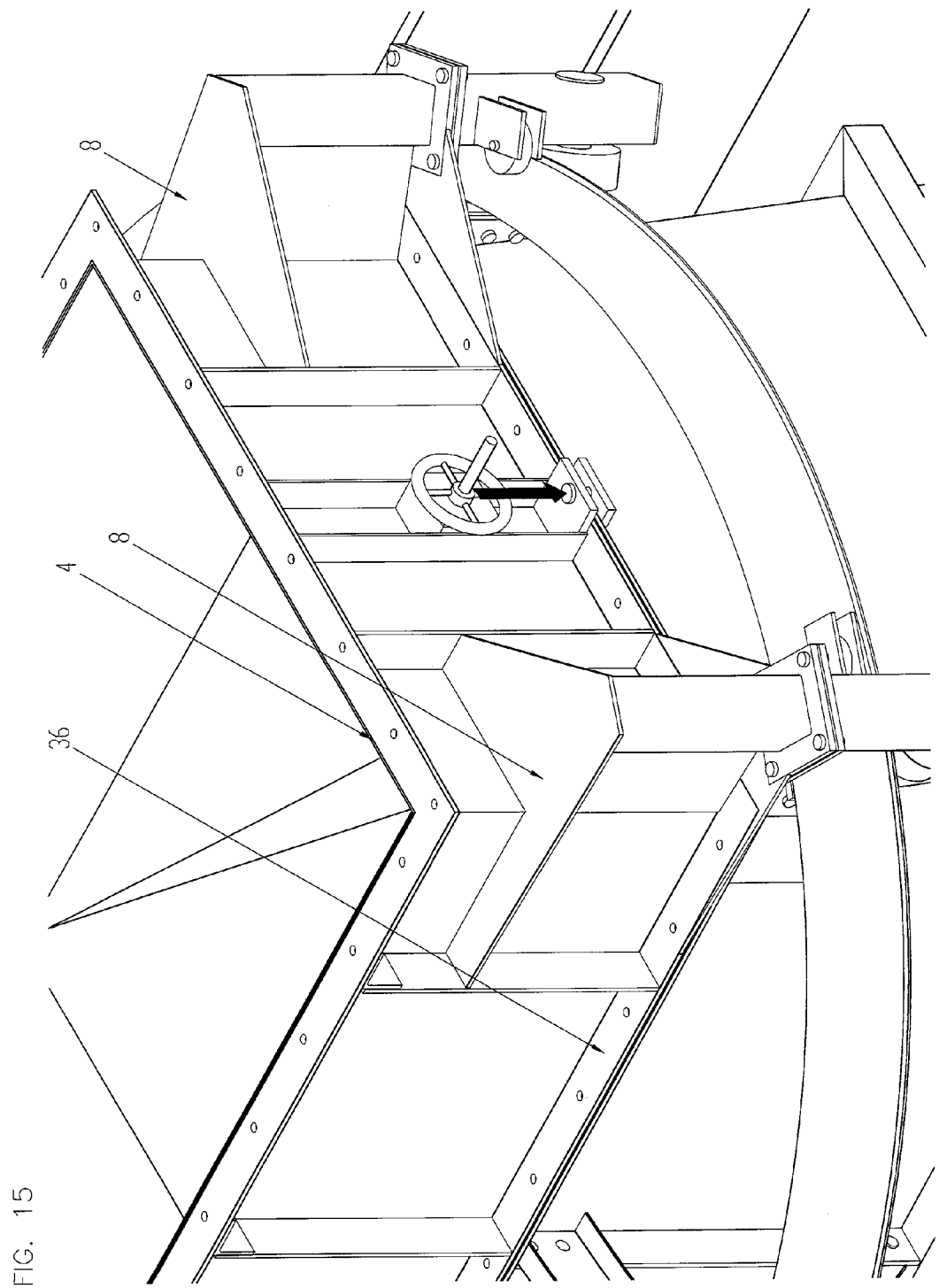
FIG. 15 depicts the reattachment of the cinch bolts between the upper chute section and the chute body.
Figure 16A:
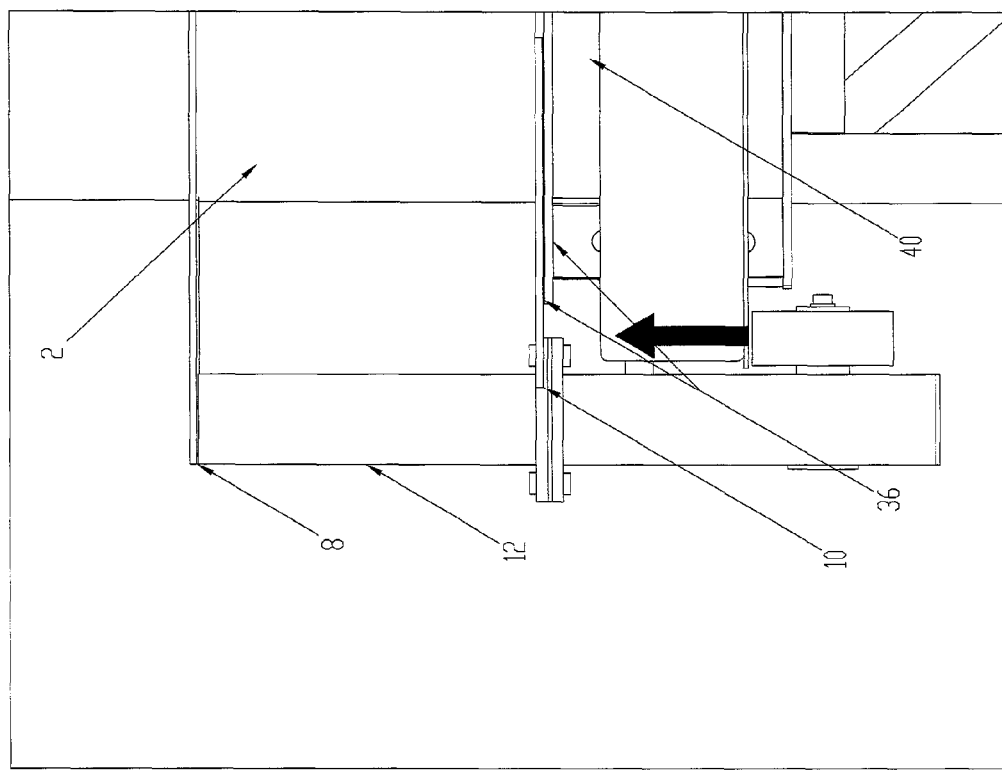
FIGS. 16A and 16B are side views of the chute depicting the raising of the chute body from the lowered position of FIG. 16A to the raised position of 16B.
Figure 16B:
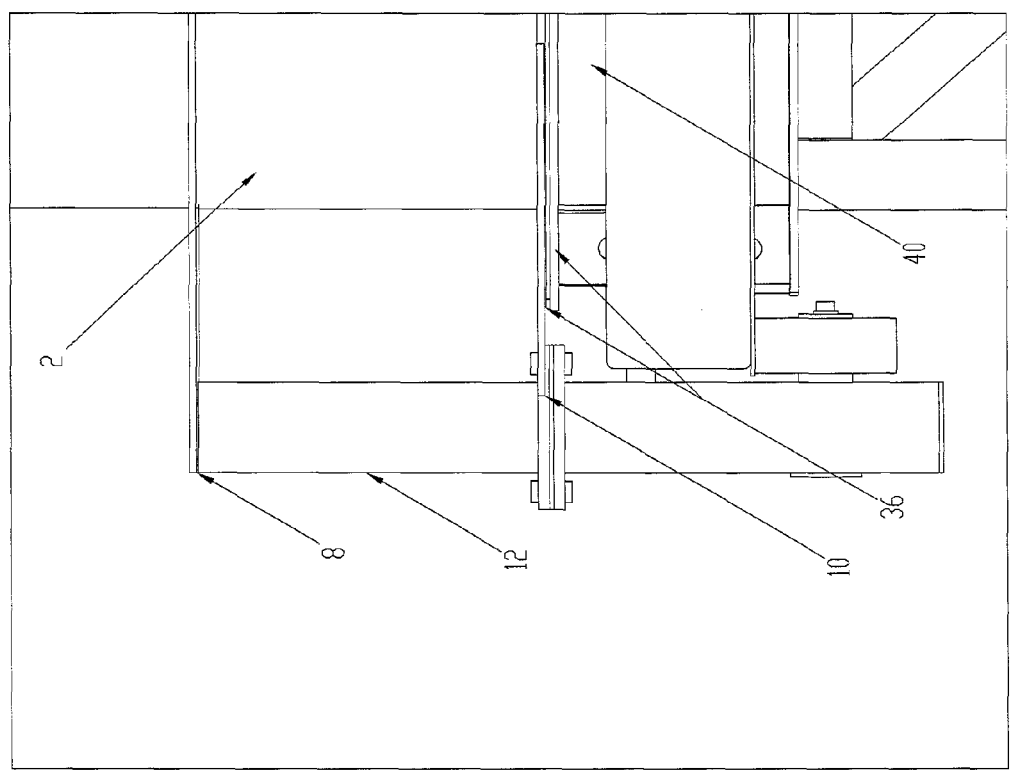
Figure 17:
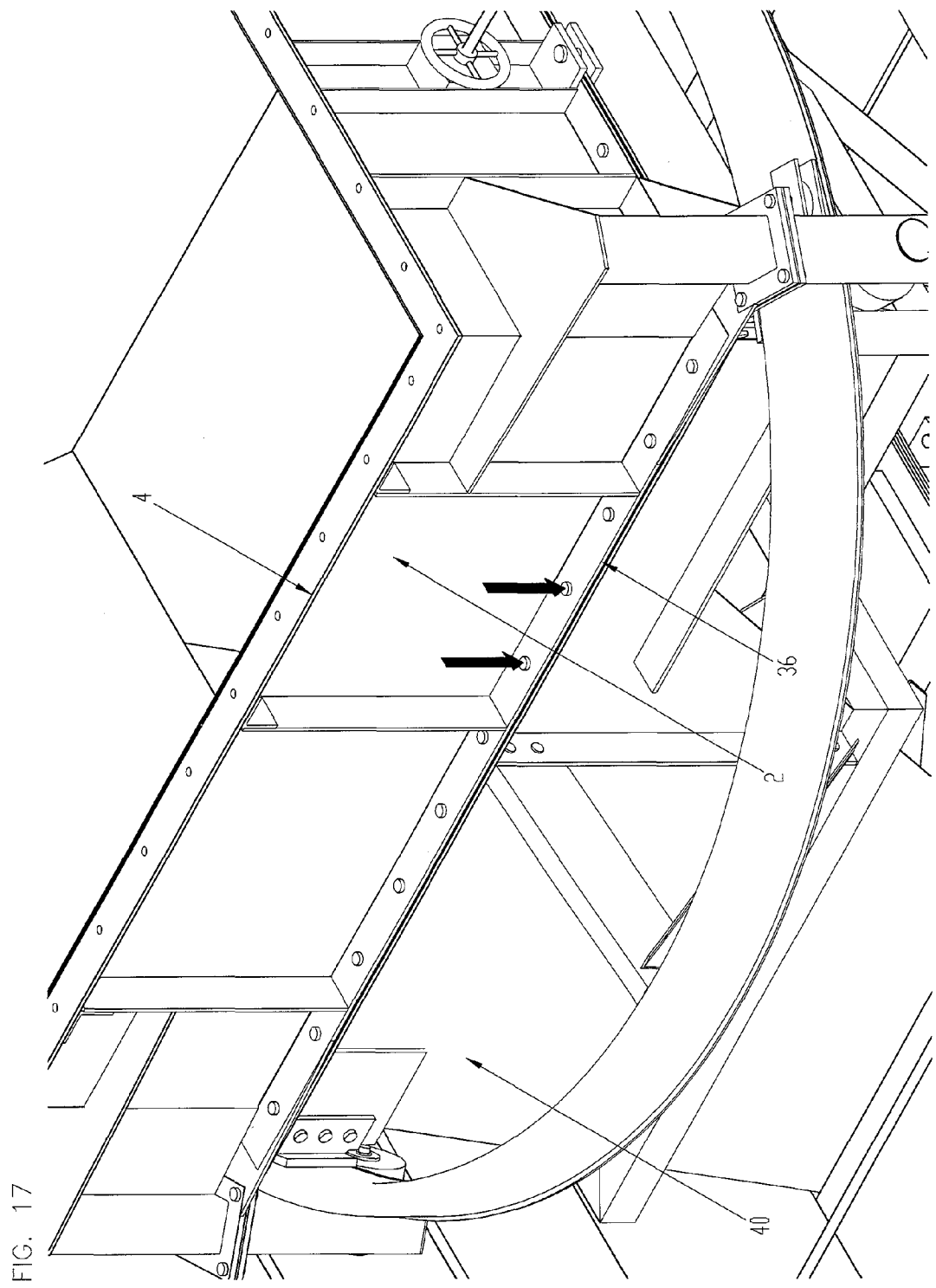
FIG. 17 depicts the reattachment of the flange bolts between the upper chute section and the chute body.
Figure 18:
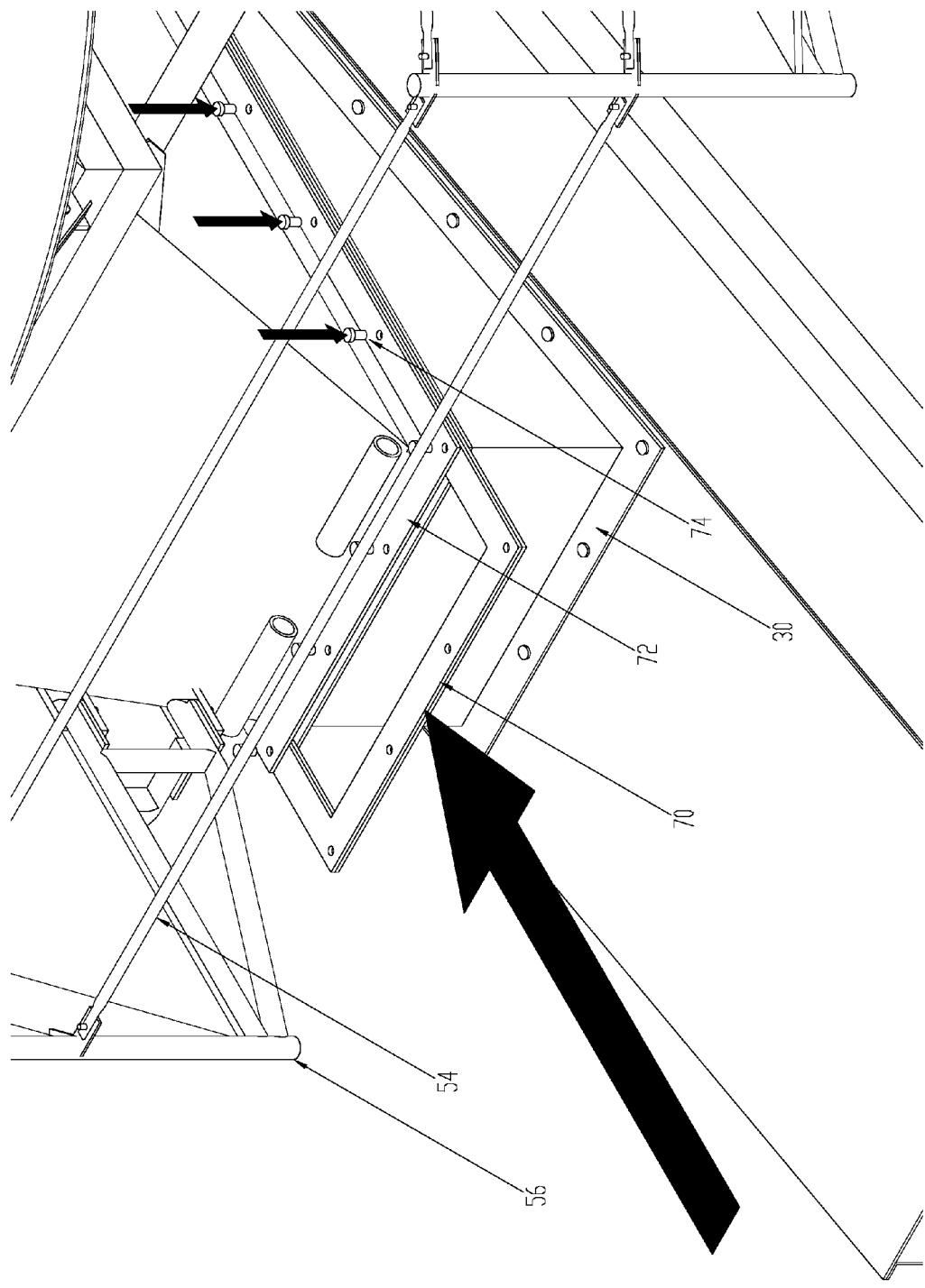
FIG. 18 depicts the insertion of one or more spacers between the chute body and the lower chute section after rotation of the chute.
Figure 19:
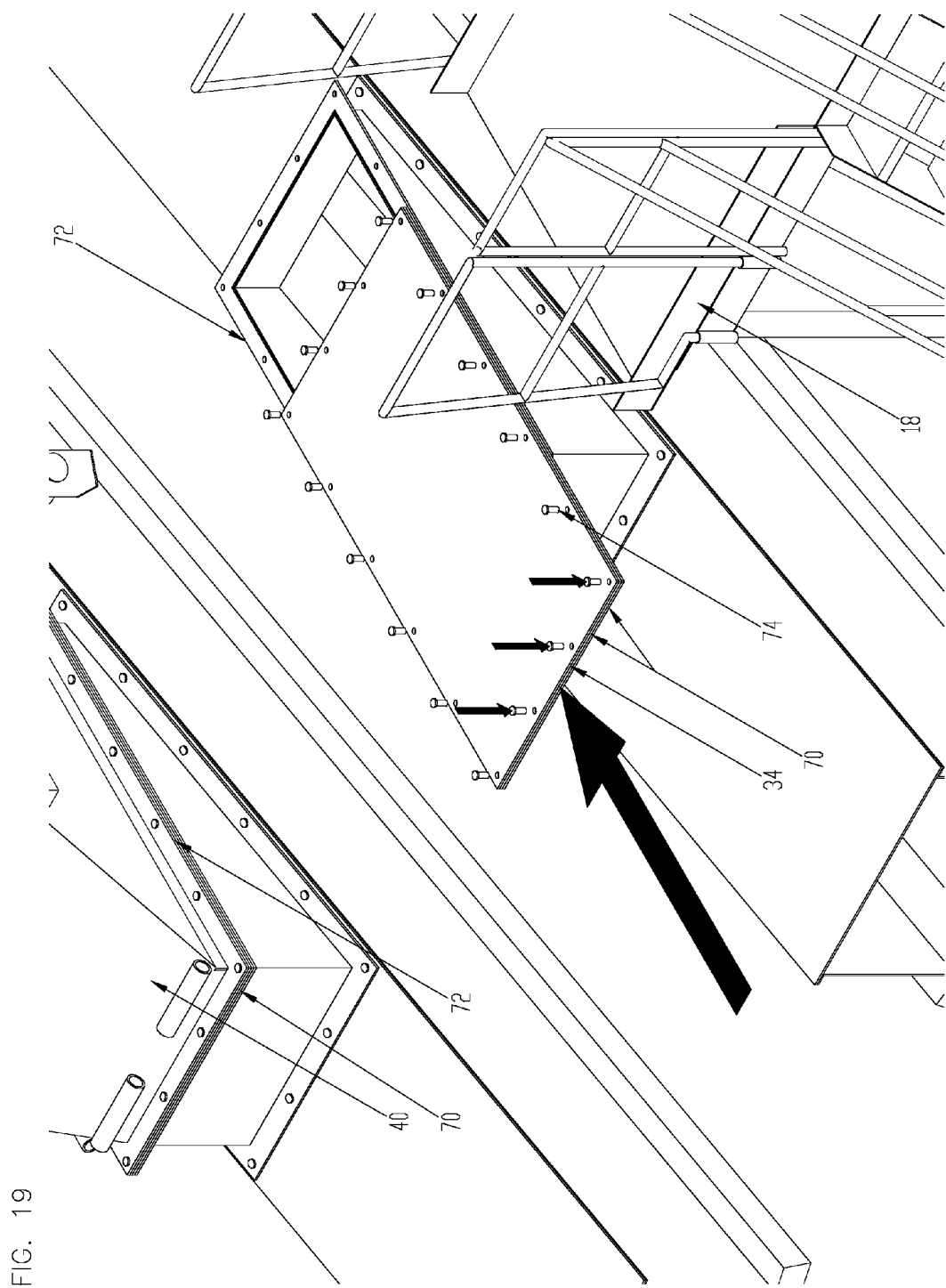
FIG. 19 depicts the placement of one or more spacers and a lower chute section cover onto a the lower chute section which is not connected to the chute body.
Figure 20:
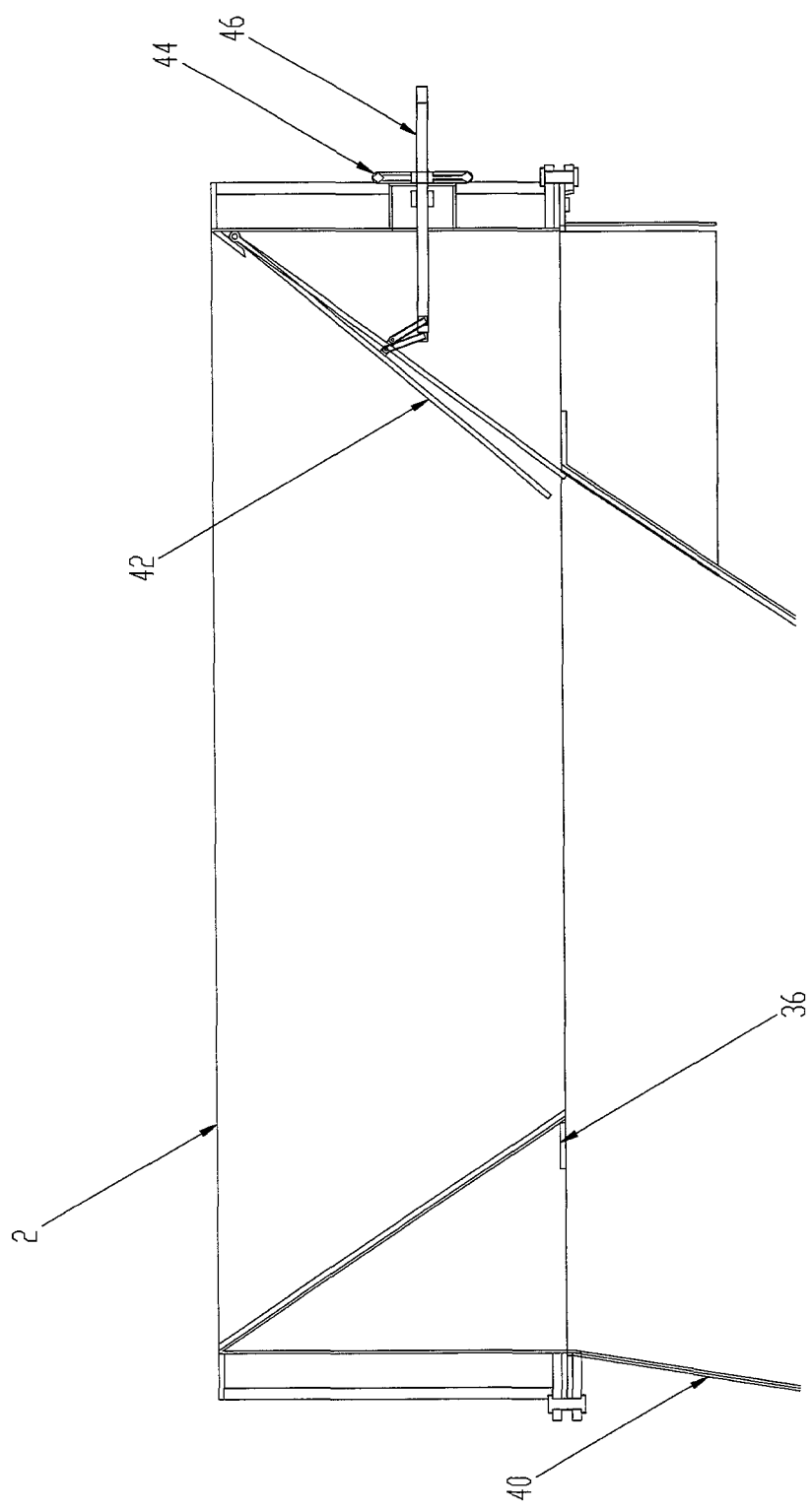
FIG. 20 depicts the lowering of the diversion plate to lie along the inner surface of the chute body.
Figure 21:
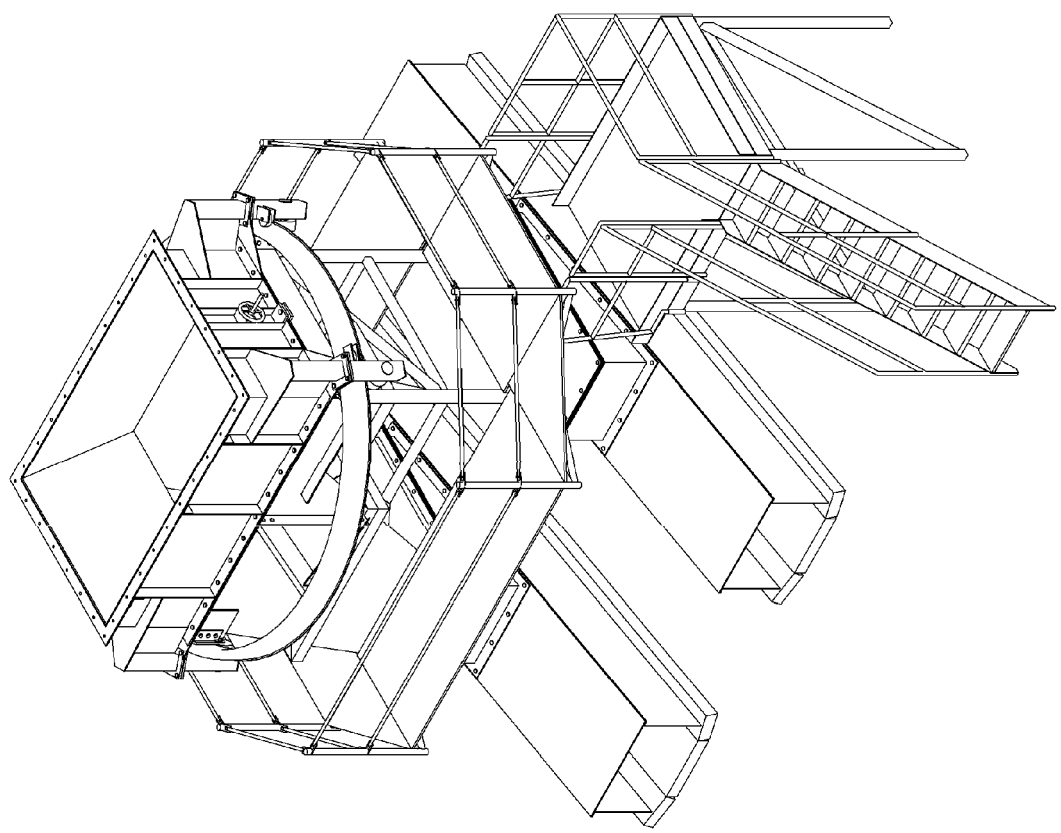
FIG. 21 depicts the chute in a second rotational position over a second conveyor.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

According to one embodiment of the present invention, there is provided a rotating chute 10 for discharge of materials selectively onto a plurality of conveyors. In this specification, a conveyor is to be understood to include a conveyor belt or any other device which may be used to convey materials towards and away from a chute, such as a cargo vehicle.

The chute 10 comprises an upper chute section 21 having a central vertical axis, a chute body 40 movable between a raised position and a lowered position and rotationally connected to the lower end of the upper chute section by rotational means for rotating the chute body about the central vertical axis between at least two selected rotational positions; and a plurality of lower chute sections 30, each lower chute section reversibly connectable at an upper end to a lower end of the chute body at one of the selected rotational positions, and at a lower end to a conveyor (6,8).

The upper chute section may have a first flange 41 at its upper end for reversible connection to a materials source or other materials handling apparatus. The upper chute section may have a second flange 36 at its lower end for reversible connection to a third flange 72 at the upper end of the chute body. A first pair of cinch plates may be disposed at opposing lower ends of the upper chute section. A second pair of cinch plates may be disposed at opposing upper ends of the chute body at positions corresponding to the first pair of cinch plates. The chute body may have a fourth flange at its lower end for reversible connection to a fifth flange at the upper end of the lower chute section. There may be one or more spacers disposed between the fourth and fifth flanges. Preferably, each spacer is 10 mm in vertical thickness. The lower chute section may have a sixth flange for reversible connection to a discharge conveyor or other materials handling apparatus.

The rotational means of the chute may comprise a plurality of hanger supports disposed around the periphery of the upper chute section. A hanger having an inwardly facing roller at its lower end may be suspended from each hanger support. The third flange on the upper end of the chute body in its raised position may be attachable to the second flange on the lower end of the upper chute section. A track encircling the upper end of the chute body may be in rolling connection with each roller on the plurality of hangers, when the chute body is in the lowered position.

Lever insertion ports disposed about the chute body may receive levers, for example pipe sections, for effecting rotation of the chute body along the rollers about the central vertical axis. The chute may have a platform railing 54 disposed about its periphery.

The upper chute section may have a diversion plate 42 for deflecting the received materials from the source conveyor inwardly toward the chute body. The diversion plate may be inwardly deflected by a spindle 46 passing through the wall of the upper chute section, connected to and controllable by an exterior operator wheel 44. The chute apparatus may also include a removable access platform 56 to provide an operator access to the operator wheel.

According to another embodiment of the present invention, the chute of the present invention may be rotated from a first rotational position for discharge to a first conveyor, into a second rotational position for discharge to a second conveyor.

In operation, the chute may be repositioned from a first rotational position over a first discharge conveyor 6 to a second rotational position over a second discharge conveyor using a simple manual procedure. The chute body, comprising the central portion of the chute apparatus, may be rotated from a first position above a first discharge conveyor and clear of a second discharge conveyor, into a second position above the second discharge conveyor and clear of the first discharge conveyor. If required, the access platform may be assembled adjacent the chute to permit operator access to the operator wheel. The assembly platform may be assembled by removing a removable section of platform railing; by folding out the swing out frame of the platform; attaching the removable railing to stabilize the frame; and placing platform planks over the platform frame.

The operator may rotate the operator wheel clockwise to direct the spindle attached thereto inwardly, causing the spindle to exert inward pressure on the external wall of the diversion plate. This pressure will tilt the diversion plate inwardly until its lowermost end is above the horizontal plane defined by the third flange, thereby permitting rotation of the chute body without interference from the diversion plate.

The lower chute section cover may be removed from the lower chute section to which the chute body is to be rotated. Flange bolts joining the cover to the fifth flange may be removed. The one or more spacers disposed on the fifth flange may be removed.

Flange bolts joining the second flange on the upper chute section to the third flange on the chute body may be loosened evenly and removed. Cinch bolts joining first pair of cinch plates on the upper chute section to the second pair of cinch plates on the chute body may be loosened and removed, causing the chute body to move from the raised position by dropping into the lowered position in which the circular track rests on the plurality of rollers. Preferably, the vertical distance between the raised and lowered positions will be approximately 10 mm, although other vertical distances are possible and understood to be within the scope of the present invention.

One end of a lever, which may be a portion of pipe, may be inserted into one of the lever receiving ports and force may be applied to the other end of the lever to effect rotation of the chute body along the rollers. Rotation may be effected until the lower end of the chute body is in the second rotational position above the second discharge conveyor.

Cinch bolts joining the first pair of cinch plates to the second pair of cinch plates may be reinserted and tightened to raise the chute body off the rollers and into the raised position. Flange bolts may be inserted between the second and third flanges and tightened evenly. The raised diversion plate in the upper chute section may be lowered by counter-clockwise rotation of the operator wheel until the diversion plate rests on the inner surface of the chute body.

Spacers 70 may be inserted between the fourth flange 72 and the fifth flange. Flange bolts 74 may be inserted and tightened to draw the fourth and fifth flanges together, thereby connecting the chute body 40 to the lower chute section 30 in the second rotational position. Spacers and a lower chute section cover 34 may be attached to the fifth flange on the lower chute section connected to the first discharge conveyor.

Optionally, the access platform may be disassembled. In one embodiment, the access platform may be connected to the chute apparatus in a hinged arrangement which permits rapid assembly and disassembly of the access platform.

There are several advantages offered by the present invention. One such advantage is an angle of materials descent which is greater for this invention than for pant-leg chutes. Whereas a pant-leg chute provides an angle of descent of 40 to 45 degrees below the horizontal, the present invention provides an angle of descent in excess of 55 degrees. This large descent angle, together with the relatively large chute opening and lack of flop gates or other obstructions inside the chute, permits minimization of blockages in the chute.

The method of operation of the chute of the present invention permits a relatively simple rotation procedure which can be completed with minimal downtime of the materials supply. The chute of the present invention may be provided in a variety of sizes customized to the requirements of each materials handling operation.

The structure of the chute of the present invention provides an enclosed chute from the first flange at the upper end of the upper chute section through to the discharge conveyor. This enclosed materials path is desirable to minimize loss of material outside of the chute. Materials are directed onto the conveyor as intended.

According to one embodiment of the invention, the rotatable chute of the present invention may be rotated into any position through 360 degrees. The chute may be rotated from a first rotational position over a first discharge conveyor into any of a plurality of other rotational positions, each over a corresponding discharge conveyor. This permits selective positioning of the chute over each of two or more conveyors.

The chute of the present invention may be employed in the handling of coal, grain or any other material which may be moved between vertically disparate conveyors through a chute apparatus. It will be appreciated by those skilled in the art that other variations of the preferred embodiment may also be practised without departing from the scope of the invention.

What is claimed is:

1. A chute for directing materials from a source conveyor to a plurality of discharge conveyors, the chute comprising:

an upper chute section having an upper end and a lower end, a central vertical axis, a first flange at the upper end, a second flange at the lower end, and a first pair of opposing cinch plates disposed at the lower end;

a chute body rotationally connected below the upper chute section having an upper end, a lower end, a third flange at the upper end defining a horizontal plane, a second pair of opposing cinch plates disposed at the upper end and connectable with cinch bolts to the first pair of cinch plates, and a fourth flange at the lower end, the chute body movable between a raised position and a lowered position and rotatable about the central vertical axis between a first rotational position and at least one rotational position using rotation means for rotating the chute body; and a plurality of lower chute sections, each having an upper end and a lower end, and a fifth flange at the upper end, each lower chute section reversibly connectable at the upper end to the lower end of the chute body at one of the selected rotational positions, and at the lower end to a conveyor;

wherein the lower end of the chute body is rotationally displaceable from a first position above a first lower chute section and away from a second lower chute section, to a second position away from the first lower chute section and above the second lower chute section.

2. The chute of claim 1, wherein the upper chute section further comprises:

a diversion plate having an external wall;
a spindle for deflecting the diversion plate;
an operator wheel for controlling the spindle; and
rotation means, wherein the rotation means comprises:
a plurality of hanger supports disposed around the periphery of the upper chute section;
a hanger extending below each hanger support;
a rotating track fixedly connected to the upper end of the chute body;
a plurality of rollers, each connected to the inner side of the lower end of each hanger, for receiving the rotating track when the chute body is in the lowered position; and
one or more lever insertion ports for receiving one end of each of one or more levers for use in manual rotation of the chute body between a first rotational position over a first discharge conveyor and a second rotational position over a second discharge conveyor.

3. The chute of claim 1, further comprising at least one removable spacer disposable between the chute body and the lower chute section to which it is connected.

4. The chute of claim 1, further comprising a plurality of lower chute section covers for removably covering each lower chute section when that lower chute section is not connected to the chute body.

5. A method of repositioning the chute of claim 2 from a first rotational position to a second rotational position, comprising the following steps:

rotating the operator wheel clockwise to direct the spindle attached thereto inwardly, causing the spindle to exert inward pressure on the external wall of the diversion plate to tilt the diversion plate inwardly until its lowermost end is above the horizontal plane defined by the third flange;

removing the lower chute section cover from the lower chute section to which the chute body is to be rotated by removing flange bolts joining the cover to the fifth flange;

removing the one or more spacers disposed on the fifth flange of the lower chute section to which the chute body is to be rotated;

removing the flange bolts joining the second flange on the upper chute section to the third flange on the chute body;

removing the cinch bolts joining the first pair of cinch plates on the upper chute section to the second pair of cinch plates on the chute body to cause the chute body to drop into the lowered position in which the rotating track is resting on the plurality of rollers;

inserting one end of each of one or more levers into a lever receiving ports;

applying force to the lever to effect rotation of the chute body along the rollers until the lower end of the chute body is in the second rotational position;

reinserting and tightening cinch bolts joining the first pair of cinch plates to the second pair of cinch plates to raise the chute body off the rollers and into the raised position;

re-inserting and tightening flange bolts between the second and third flanges;

lowering the diversion plate in the upper chute section by counter-clockwise rotation of the operator wheel until the diversion plate rests on the inner surface of the chute body;

inserting one or more spacers between the fourth flange and the fifth flange; and reinserting and tightening flange bolts between the fourth and fifth flanges to connect the chute body to the lower chute section in the second rotational position.

6. The chute of claim 1, wherein the angle of descent from the source conveyor to the discharge conveyors is at least 55 degrees below the horizontal.

7. The chute of claim 1, wherein the chute is continuous and enclosed from its upper end to its discharge end.

* * * * *